United States Patent [19]
Sutherland et al.

[11] Patent Number: 6,102,431
[45] Date of Patent: Aug. 15, 2000

[54] COLLAPSIBLE BABY STROLLER AND RELEASABLE LOCKING AND FOLDING MECHANISM THEREFOR

[75] Inventors: Scott A. Sutherland; Andreas von Flotow, both of Hood River, Oreg.

[73] Assignee: Hood Technology Corporation, Hood River, Oreg.

[21] Appl. No.: 09/088,259

[22] Filed: Jun. 1, 1998

[51] Int. Cl.[7] .................................................. B62B 7/00
[52] U.S. Cl. ..................... 280/642; 280/644; 280/646; 280/647; 280/650; 280/47.17; 280/47.25; 403/99; 403/100; 403/102
[58] Field of Search ................... 280/62, 47.2, 47.24, 280/47.25, 47.34, 47.38, 47.17, 47.22, 642–646, 650, 658; 403/99, 100, 102

[56] References Cited

U.S. PATENT DOCUMENTS

| | | | |
|---|---|---|---|
| 4,614,454 | 9/1986 | Kassai | 403/62 |
| 5,028,061 | 7/1991 | Hawkes | 280/47.4 |
| 5,029,891 | 7/1991 | Jacobs . | |
| 5,039,118 | 8/1991 | Huang | 280/47.371 |
| 5,056,805 | 10/1991 | Wang | 280/47.36 |
| 5,123,670 | 6/1992 | Chen . | |
| 5,188,389 | 2/1993 | Baechler et al. . | |
| 5,244,228 | 9/1993 | Chiu | 280/64 |
| 5,257,799 | 11/1993 | Cone et al. | 280/642 |
| 5,299,825 | 4/1994 | Smith . | |
| 5,356,171 | 10/1994 | Schmidlin et al. . | |
| 5,364,119 | 11/1994 | Lea . | |
| 5,468,009 | 11/1995 | Eyman et al. . | |
| 5,509,747 | 4/1996 | Kiendl | 403/102 |
| 5,522,614 | 6/1996 | Eyman et al. . | |
| 5,536,033 | 7/1996 | Hinkston . | |
| 5,562,300 | 10/1996 | Nelson . | |
| 5,590,896 | 1/1997 | Eichhorn . | |
| 5,617,592 | 4/1997 | Cheng | 5/99.1 |
| 5,683,096 | 11/1997 | Zonka . | |
| 5,687,985 | 11/1997 | Sack | 280/650 |
| 5,695,212 | 12/1997 | Hinkston . | |
| 5,730,542 | 3/1998 | Cheng | 403/102 |
| 5,765,856 | 6/1998 | Kiser | 280/642 |
| 5,775,460 | 7/1998 | Stone | 182/22 |
| 5,820,140 | 10/1998 | Huang | 280/30 |
| 5,906,013 | 5/1999 | Wang | 5/99.1 |

*Primary Examiner*—Eric Culbreth
*Assistant Examiner*—L. Lum
*Attorney, Agent, or Firm*—Bell, Boyd & Lloyd LLC

[57] ABSTRACT

A baby stroller for transporting an infant over flat, rough, or uneven terrain at speeds faster than normal walking speed is disclosed. This baby stroller can be folded to make it easier to stow and transport. The folding mechanism, a unique feature of the design, enables the user to fold and unfold the stroller with one hand. Other features of the stroller include a quick release mechanism for the rear wheels, a foot-activated parking brake, and a canopy deployment mechanism.

18 Claims, 6 Drawing Sheets

COLLAPSIBLE BABY STROLLER AND RELEASABLE LOCKING AND FOLDING MECHANISM THEREFOR

BACKGROUND OF THE INVENTION

1. Field of the Invention

The present invention relates to wheeled infant carriages or designed to carry an infant smoothly and safely while walking, jogging or traversing uneven, rough, or unpaved terrain. And more particularly to a design conveniently portable and collapsible.

2. Description of The Prior Art

Traditionally, baby strollers have been used to push an infant slowly on a relatively hard, smooth floor or paved surface. As a result, the strollers were made with short wheeled bases and small wheels. These strollers work well at slow speed, but are extremely unwieldy and even dangerous on rough surfaces or at higher speeds.

As parents have become more health conscious, jogging and fast walking have become popular pastimes. Because baby strollers were not designed to be operated at high speed or on rough terrain, it was infeasible for a parent to jog or walk fast using a traditional baby stroller. Even for non-jogging parents, the need for an improved baby stoller has been apparent. The small, plastic wheels and short wheel bases customarily used for the baby strollers are almost useless when it is desired to walk with an infant in a grassy park or on a rough road or sidewalk. Parents end up not walking with the infant at all or only walking in limited areas.

Recently, all-terrain baby strollers have been designed to overcome these problems. These strollers typically employ much larger wheels and longer wheel bases. The stroller frame and frame connections are constructed to be stronger and larger to handle the heavy-duty use they may receive. These all-terrain strollers have their drawbacks. The increased size has made them difficult to store and transport and the folding/collapsing mechanisms are time consuming and cumbersome. For this reason, the present invention provides a quick and easy method of collapsing the stroller for storage or transport.

3. Objects and Advantages

Collapsible strollers are not a new concept. The collapsing process for most strollers, however, typically requires the use of both hands, often requires the application of large forces, and may be dangerous due to scissoring of truss-like members of the stroller structure. Most collapsing mechanisms are not intuitive to the user and require a lesson from a sales person or studying of instructions. Often, the parent is holding packages or the infant in one arm and has only one hand free to collapse and stow the stroller. The present invention provides an intuitive folding mechanism, requiring only one hand to collapse or unfold the stroller. Safeguards assure that the stroller collapses only when desired by the parent. Further, there are no pinch points or scissoring members in the folding mechanism.

When jogging with a conventional all-terrain stroller, the axle connecting the two rear tires often impedes the stride of the jogger (especially joggers with long strides). In the present invention, the rear wheels are cantilevered, giving the jogger clearance for a long stride.

Other novel features of the design are the use of an over-center mechanism to deploy a sun canopy on the stroller and another over-center mechanism to engage a foot-activated parking brake.

SUMMARY OF THE INVENTION

The present invention is an all terrain/jogging, portable, collapsible baby stroller. The stroller frame consists of three cantilevered, tubular sections, which are hinged and constrained to move together by a means for such purpose. The three cantilevered sections are the front fork, which holds the front tire, the handle bar, and the rear support, on which the rear tires are mounted.

The means for hinging and constraining the motion of the cantilevered sections consists of a mechanism on either side of the stroller. Each mechanism consists of two meshing partial gears and a spring-loaded piston, which moves in line with the rear support. Secured to the side of each gear is a knife blade follower, which comes in contact with the piston in the locked and unfolded position. One gear is fixed to the front fork while the other is fixed to the handle bar. In the locked and unfolded position, the rotation of the gears with respect to one another is constrained by a flat in one direction and the knife blade followers against the extended spring loaded piston in the other direction. The cantilevered sections are constrained at fixed angles to one another. In this embodiment, the front fork forms approximately a 90-degree angle with the rear support and approximately a 180-degree angle with the handle bar. The rear support bisects the angle between the handle bar and the front fork.

To collapse the stroller, the stroller is lifted by a strap which is connected on either end to a lever, which depresses the spring-loaded piston on each side of the stroller. With the depression of the spring-loaded piston, the rotation of the gears relative to one another is no longer constrained. Continuing to hold the strap causes the stroller to collapse under its own weight; all of the cantilevered sections rotate into positions approximately parallel to one another.

The front fork consists of two separate pieces of tubing. At one end, each piece is fixed to the folding mechanism. At the opposite end a notch is cut in each tubular piece to accommodate the axle of the front tire. The notch allows the user to quickly remove the front tire.

The handle bar is made from a single piece of tubing or bar stock bent through 180 degrees so that the ends of the piece are parallel to one another. Each end is fixed to one of the two folding mechanisms. The bent portion of the tubing is typically from where the stroller will be pushed. Therefore, it is coated with foam for comfort.

The present embodiment of the invention contains a retractable canopy to shelter the infant from the elements. The canopy is made from a piece of fabric. The front edge of the fabric is secured to a batten or bent rod, which gives the canopy its shape. The rear edge is secured to the handle bar. The forward batten is connected to the handle bar through two over-center mechanisms. These over-center mechanisms allow the canopy to be fully deployed or fully retracted, in a firm and stable manner.

Each over center mechanism consists of a casing, a spring-loaded rod and a rotating piece. The spring-loaded rod is constrained as a slider joint by the casing and as a pin joint by the rotating piece. The casing is fixed to the handle bar and the rotating piece is fixed to the batten. The rotational freedom of the rotating piece is constrained by a groove in the casing. Because of the motion constraints on the rotating piece, the canopy will become fully deployed if the canopy is moved more than half way to the deployed position or fully retracted if the rotating piece is moved less than half way to the deployed position.

The rear wheels are mounted to the rear support via a hub assembly for such purpose. Each rear wheel axle fits into a hole in a hub assembly case, which is injection molded plastic. The axle is notched and held in place by a spring-loaded pin, which fits in the notch. The spring-loaded pin acts as a quick-release mechanism. When the pin is pulled, the axle can easily be removed from the hub assembly. To replace the wheel, the axle is inserted into the hub assembly and snaps into place, as the spring-loaded pin seats in the groove in the axle.

The hub assembly also houses a foot brake. The foot brake employs an over-center mechanism similar to the one used for the canopy deployment. The foot brake lever, typically made from stamped steel, is pinned to the hub assembly casing. When the lever is rotated, a finger, which is part of the lever, engages with a toothed disk, which is fixed to the wheel. The rotating motion of the lever is affected by an over-center mechanism. The over-center mechanism consists of a spring-loaded rod, pinned to the lever on one end and fixed as a slider by the hub assembly casing on the other end. When the lever is between the fully-engaged and the fully-disengaged positions, the over-center mechanism tends to move the lever to either position. Another important feature to the design of this foot brake is the use of plastic or metal balls on the rod, between which the spring seats. The balls prevent the spring from binding on the hub assembly casing or the lever and allow low friction movement.

DESCRIPTION OF THE DRAWINGS

The above features, advantages, and object of the present invention will more fully be appreciated through consideration of the following drawings in which.

REFERENCE NUMERALS IN DRAWINGS

| 2 | Front Fork |
|---|---|
| 3 | Rear Support |
| 4 | Handle Bar |
| 10 | Folding Mechanism |
| 11 | Outer Half of Folding Mechanism Case |
| 12 | Inner Half of Folding Mechanism Case |
| 13 | Forward Partial Gear |
| 14 | Rear Partial Gear |
| 15 | Knife Blade Follower on Forward Partial Gear |
| 16 | Knife Blade Follower on Rear Partial Gear |
| 17 | Spring Loaded Piston |
| 18 | Release Lever |
| 19 | Fulcrum Plate |
| 20 | Fulcrum Pin |
| 21 | Gear Hubs |
| 22 | Spring for Piston |
| 30 | Front Wheel |
| 32 | Foot Rest |
| 34 | Release Strap |

-continued

| 36 | Infant Seat |
|---|---|
| 40 | Hub Assembly |
| 41 | Hub Assembly Case |
| 42 | Quick Release Pin |
| 43 | Quick Release Spring |
| 44 | Brake Lever |
| 45 | Brake Lever Fulcrum |
| 46 | Over-center Mechanism Rod |
| 47 | Over-center Mechanism Spring |
| 48 | Nylon Balls |
| 49 | Toothed Disk |
| 50 | Assembly Bolts |
| 51 | Rear Axle |
| 60 | Mechanism for retracting Canopy |
| 61 | Over-center Mechanism Rod |
| 62 | Canopy Deployment Mechanism Casing |
| 63 | Rotating Piece |
| 64 | Forward Canopy Batten |
| 65 | Over-center Mechanism Spring |
| 66 | Fastener from Casing to Handle Bar |
| 67 | Fastener from Casing to Handle Bar, mating with groove in rotating piece |
| 68 | Fastener about which rotating piece rotates |
| 69 | Canopy |

DESCRIPTION OF THE INVENTION

1. Overall Stroller Configuration

Figure 1:
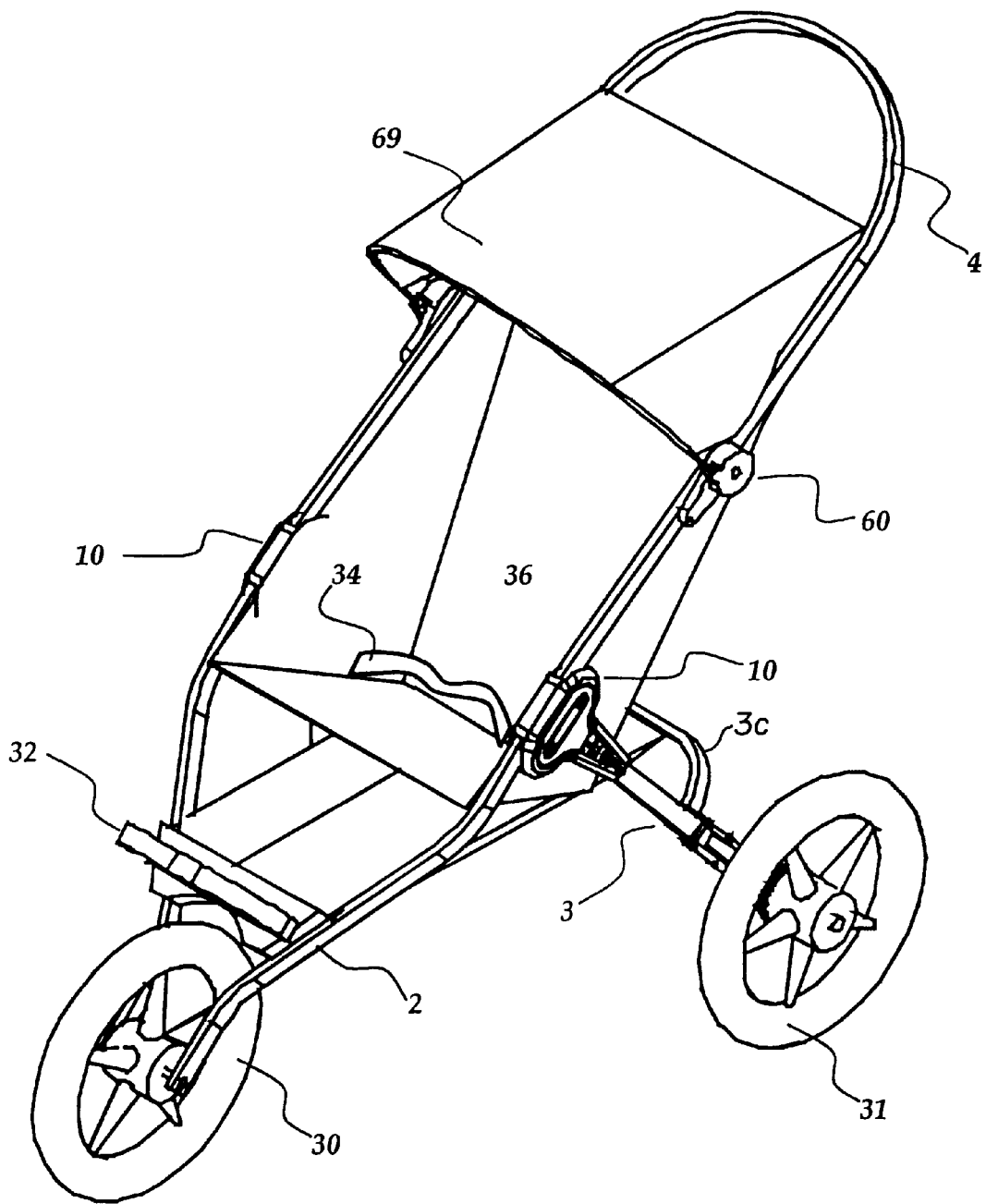
FIG. 1 shows an isometric view of the present invention, a collapsible all-terrain stroller.

Referring now to the drawings, particularly FIG. 1, there is shown a three-wheeled all terrain collapsible infant stroller. Three rigid assemblies 2–4, which are connected to one another via to folding mechanisms 10, form the fundamental structure of the stroller.

The front fork 2 consists of two pieces of tubing 2a–2b. One end of each front fork section 2a–2b is notched in order to accommodate the axle of the front wheel 30, allowing for easy disassembly. The other end of each front fork half 2a–2b is attached to a folding mechanism 10. A footrest 32 is secured to both halves 2a–2b of the front fork 2 above the front wheel 30.

The rear support 3 consists of two rear legs 3a–3b and a cross brace 3c, which are made from tubing. For each leg 3a–3b, one end is secured to a folding mechanism 10 and the other secured to a hub assembly 40. The cross brace 3c is secured to both rear legs 3a–3b, sufficiently close to the folding mechanism 10 to provide clearance for long strides.

The handle bar 4 is made from a single piece of tubing or bar stock, bent through 180 degrees. Each end of the handle bar 4 is secured to one of the two folding mechanisms 10. A retractable canopy 60 is attached to the handle bar 4 in order to protect the infant from the elements.

2. Releasable Locking and Folding Mechanism

Figure 2:
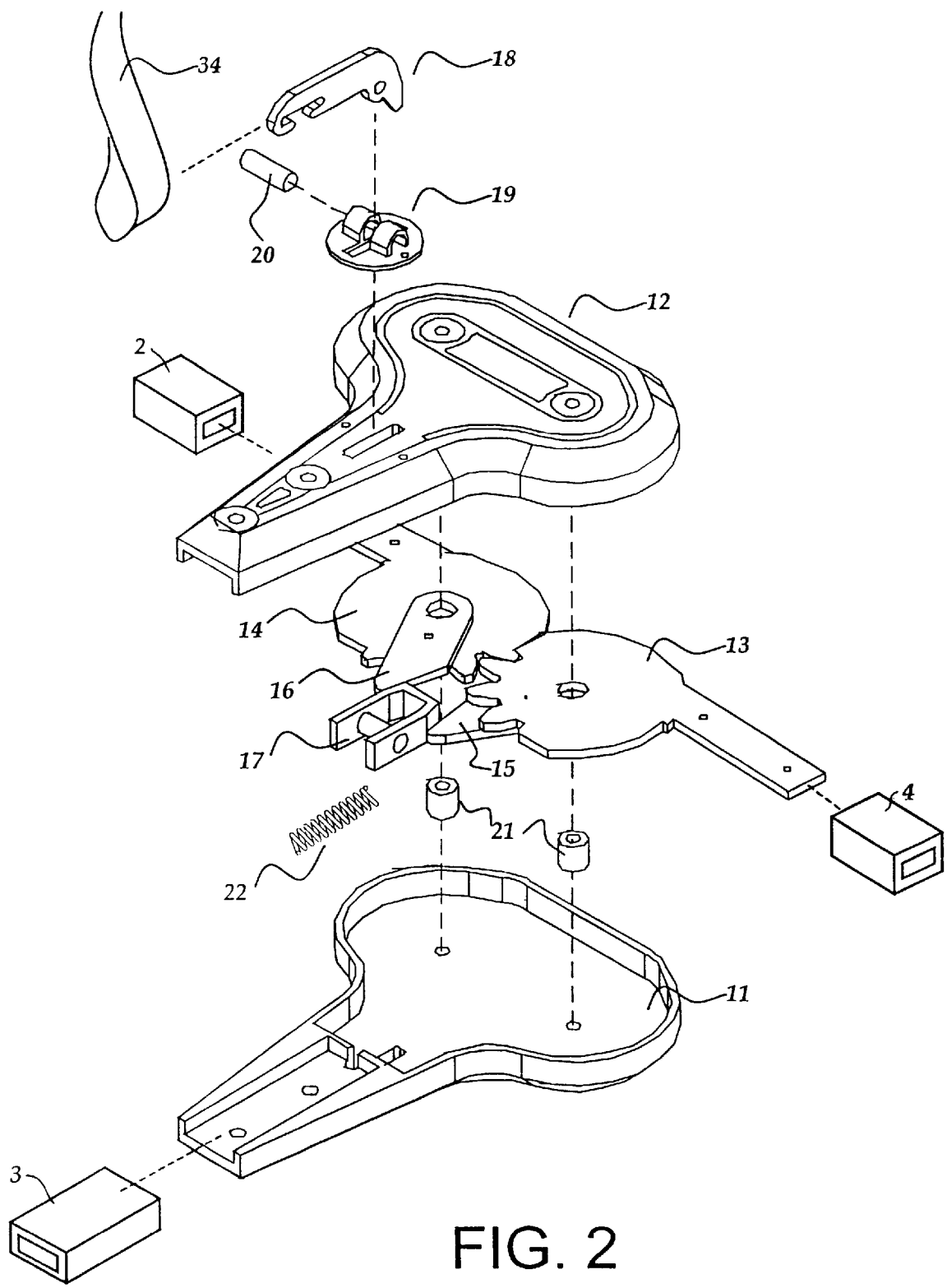
FIG. 2 shows an exploded view of the folding mechanism, which allows the user to easily fold and unfold the stroller.
Figure 3:
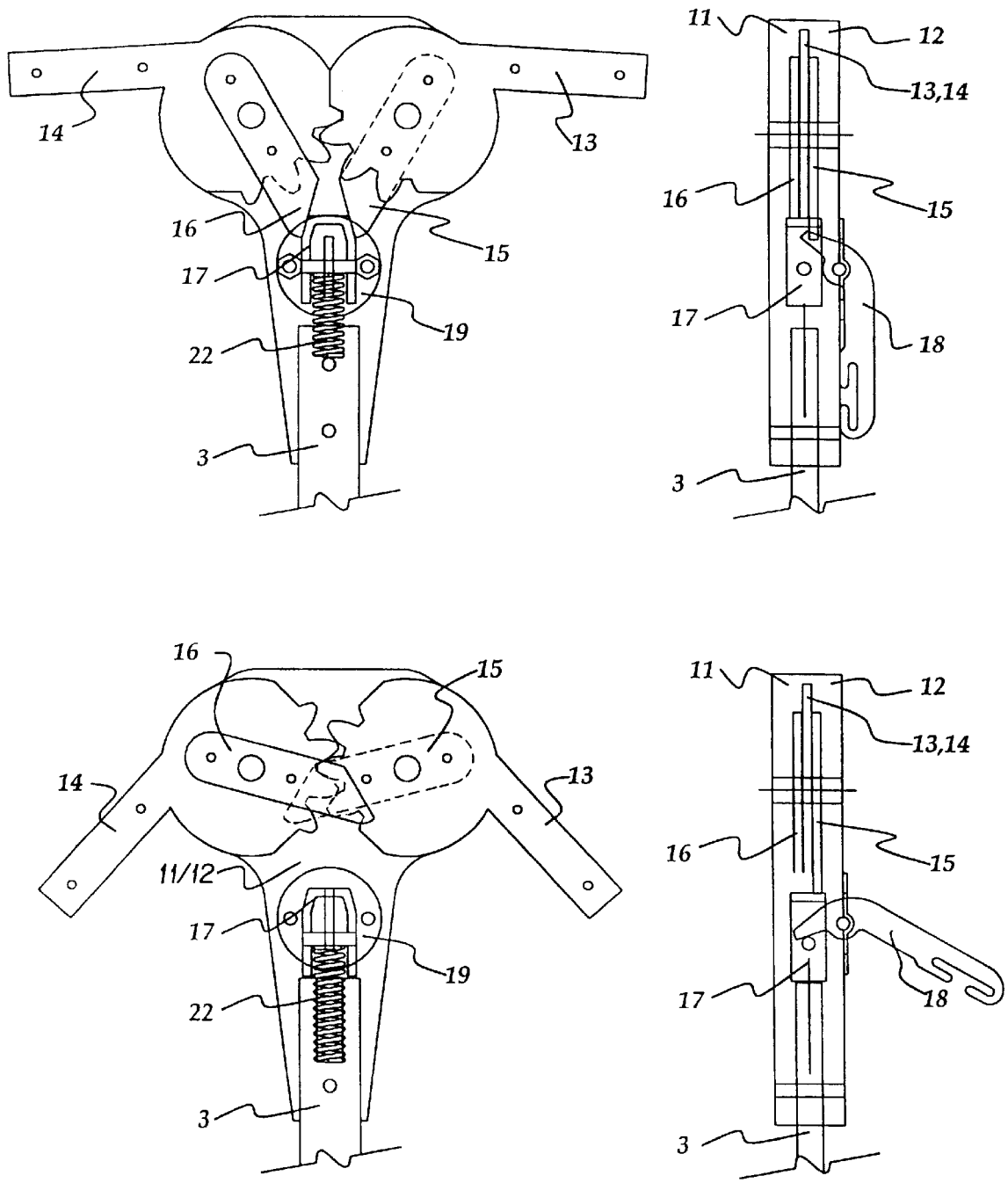
FIG. 3 shows orthogonal views depicting the functionality of the folding mechanism.

A key feature of the present invention is a novel folding mechanism 10. An exploded view of the folding mechanism 10 is shown in FIG. 2 and a functionality view is shown in FIG. 3. The folding mechanisms 10 control the angles between the front fork 2, the rear support 3, and the handle bar 4, and thus enables the user to collapse or unfold the stroller with ease. Within the folding mechanism are two meshing partial gears 13–14, made of stamped steel in the preferred embodiment of the present invention. The gears 13–14 rotate about gear hubs 21, which are fixed to the folding mechanism case, consisting of a outer 11 and inner 12 half. Partial gear 13 has an appendage which is fastened to the handle bar 4 and partial gear 14 has an appendage which is fastened to the front fork 2. The case 11–12 is secured to the rear support 3. The meshing of the gears 13–14 constrains the relative angle between the handle bar 4 and the front fork 2, so that when the handle bar 4 is rotated toward the rear support 3, the front fork 2 rotates toward the rear support 3 and vice versa. This is a key feature in the design because it enables the stroller to be unfolded by merely lifting on the handle bar 4. Gravity rotates the handle bar 4 away from the rear support 3, and the front fork 2 swings out into position.

It is desired to keep the stroller in a locked and open position until the user wishes to fold it up for storage or transport. The folding mechanism 10 contains features to accomplish this. Each gear 13–14 has a knife blade follower 15–16, made from stamped steel in the preferred embodiment, fastened to it. Knife blade follower 15 is fixed to the inner side of partial gear 13 and knife blade follower 16 is fixed to the outer side partial gear 14 so that the followers 15–16 do not interfere with one another when the stroller is collapsed. When the stroller unfolds into a fully open position, a piston 17, is pushed down by the knife blade followers 15–16 against a loaded spring 22 until the followers 15–16 reach the fully open position and the piston 17 is forced between the followers 15–16 by the spring 22. Thus the rotation of the handle bar 4 and front fork 2 relative to the rear support 3 is constrained by a lack of gear teeth in one direction and the knife blade followers 15–16 against the spring-loaded piston 17 in the other direction.

A key feature of the folding mechanism 10 is that the piston 17 and followers 15–16 are engaging in a wedging manner due to the angled piston 17—follower 15–16 engagement surfaces. This wedged piston 17 has sufficient travel to accommodate manufacturing tolerances and wear accumulations by continuing to wedge the followers apart until the mechanism 10 is firmly locked open. The piston spring 22 is adequately sized to always drive the piston 17 into its highest possible position, maximizing the rigidity of the entire frame structure.

It is also desired to be able to easily collapse the stroller for storage or transport. The stroller is unable to collapse until the spring-loaded piston 17 is retracted so that the gears 13–14 are free to rotate relative to the case 11–12. In order to retract the spring-loaded piston 17, a release lever 18 rocks about fulcrum pin 20, which is held in place by fulcrum plate 19. The fulcrum plate 19 is fastened to the inner half 12 of the case so that when a force is applied to the long arm of the release lever 18, a force which tends to retract the spring-loaded piston 17 is generated.

In the preferred embodiment of the invention, a release strap 34 is connected to the release lever 18 on both folding mechanisms 10. The release strap 34 lays in the seat 36 so that when the infant is removed from the stroller, the parent can lift on the release strap 34, which retracts the spring-loaded pistons 17, allowing the handle bar 4 and front fork 2 to rotate toward the rear support 3. Because the center of gravity of the handle bar 4 is typically above the folding mechanism 10, the stroller tends to collapse under its own weight when the release strap 34, is pulled, thus requiring only one free hand to collapse the stroller. Similarly, when unfolding the stroller, lifting the handle bar 4 tends to unfold the stroller. When the stroller fully open, the spring-loaded piston 17, moves between the knife blade followers 15–16, locking the stroller in its operational position.

3. Canopy Deployment Mechanism

Figure 4:
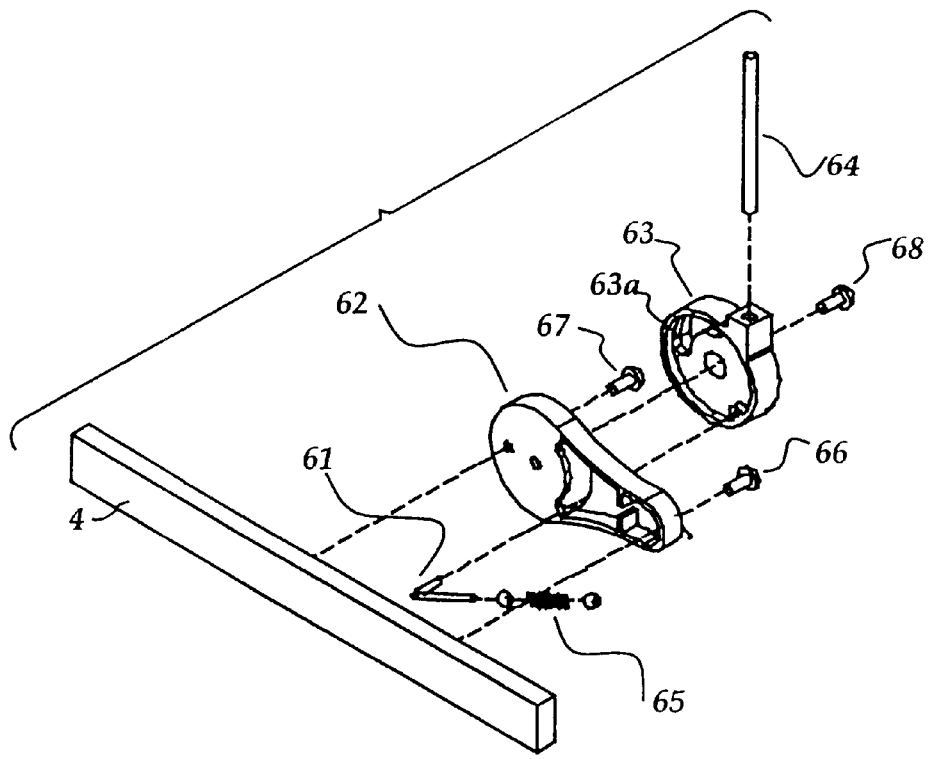
FIG. 4 shows an exploded view of the canopy deployment mechanism.
Figure 5:
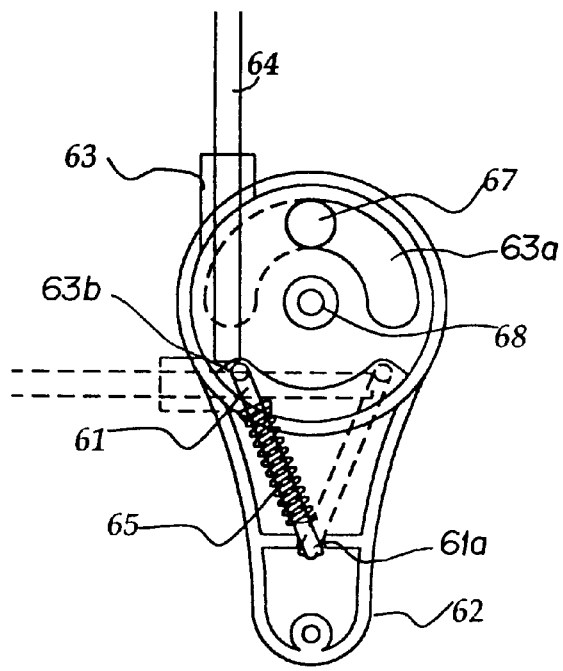
FIG. 5 depicts the functionality of the canopy deployment mechanism.

The mechanism 60 for deploying and retracting a canopy 69 is a novel feature of the present invention. An exploded view of this mechanism is shown in FIG. 4 and a functionality view is shown in FIG. 5. This mechanism consists primarily of a spring-loaded rod 61, a mechanism casing 62, and a rotating piece 63. The casing 62, made from injection molded plastic in the preferred embodiment, is fixed to the handle bar 4 with fasteners 66–67. The rotating piece 63, made from injection molded plastic in the preferred embodiment, rotates about fastener 68, which mates with the casing 62. Spring 65 fits around rod 61. The spring-loaded rod 61 has a slider joint 61a with the casing 62 and a pin joint 63b with the rotating piece 63. Batten 64 is constrained to move with the rotating piece 63 via an interference fit between the two pieces. As the rotating piece 63 rotates, the spring 65 becomes compressed. The compressed spring 65 tends to force the canopy 69 to its open position or to its deployed position depending on whether it has moved more than half way through its range of motion. The motion of the rotating piece 63 is further constrained in its rotation by fastener 67 being seated in groove 63a of the rotating piece 63.

4. Hub Assembly

Figure 6:
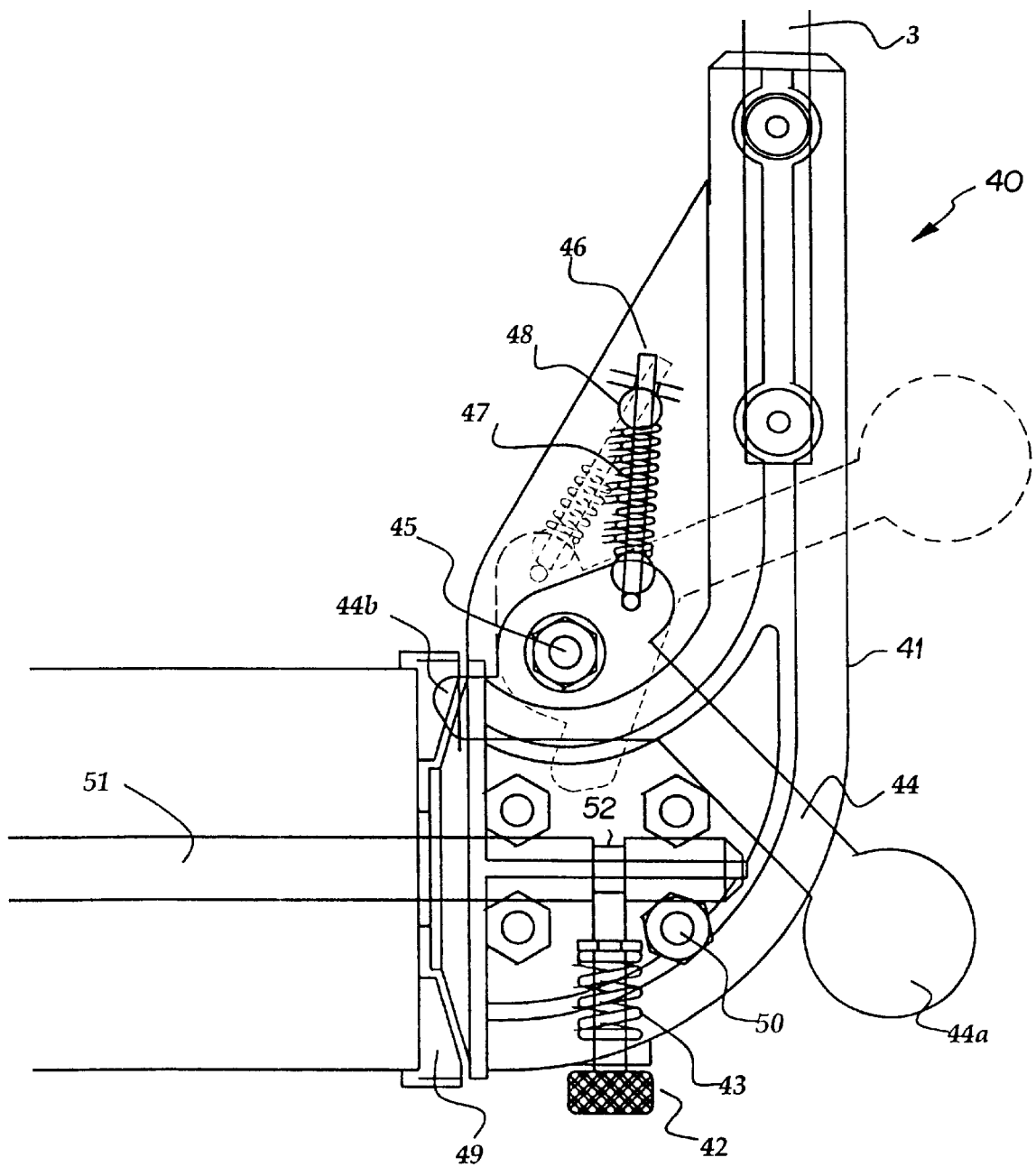
FIG. 6 shows an orthogonal view of the hub assembly.

The hub assembly 40, shown in FIG. 6 serves the following functions:

1) Provide a hub for the rear wheel axles.
2) Provide a quick release for the rear wheels.
3) Provide a rear wheel parking brake, deployable with an easy foot motion.

There are two hub assemblies 40 in the preferred embodiment; one fastened to the end of each of the rear legs 3a–3b. Each rear wheel 31 has its own axle 51. The axle 51 fits into the injection-molded hub assembly case 41 held together with assembly bolts 50, which are housed by the case 41 as well. A notch 52 is machined in the axle 51 in order to mate with a spring-loaded quick release pin 42. The quick release pin 41 prevents the axle 51 from separating from the hub assembly 40. If the user desires to remove a rear wheel 31, the quick release pin 41 is pulled away from the axle 51 and the wheel is easily removed (not shown). The spring 43 pulls the release pin 41 back so that when the axle 51 is reinserted into the hub assembly 40, it snaps securely into place.

In order to prevent the stroller from rolling when parked, a foot activated parking brake feature is designed into the hub assembly 40. A brake lever 44, made from stamped steel in the preferred embodiment, has its fulcrum 45 fixed to the hub assembly case 41. The brake lever 44 has a bulbous end 44a, in the preferred embodiment, to facilitate easy deployment or release of the brake with a simple foot motion. When the brake lever 44 is rotated down, an appendage 44b on the brake lever 44 engages with a toothed disk 49, which is fixed to the rear wheel 31. It is undesirable to have the brake inadvertently deploy or release. For this reason, an over-center mechanism is included in the preferred embodiment. A spring-loaded rod 46 is pinned to the brake lever 44 and has a slider joint with the hub assembly case 41. The spring-loaded rod 46 is designed so that the brake lever 44 is most stabile in either the fully deployed or fully retracted positions and only a deliberate foot motion from the user will change the foot brake position. In the preferred embodiment, plastic or metal balls are placed on the rod 46 on both sides of the spring 47 in order to prevent the spring 47 from binding on the brake lever 44 or hub assembly case 41.

5. Folding Sequence

Figure 7:
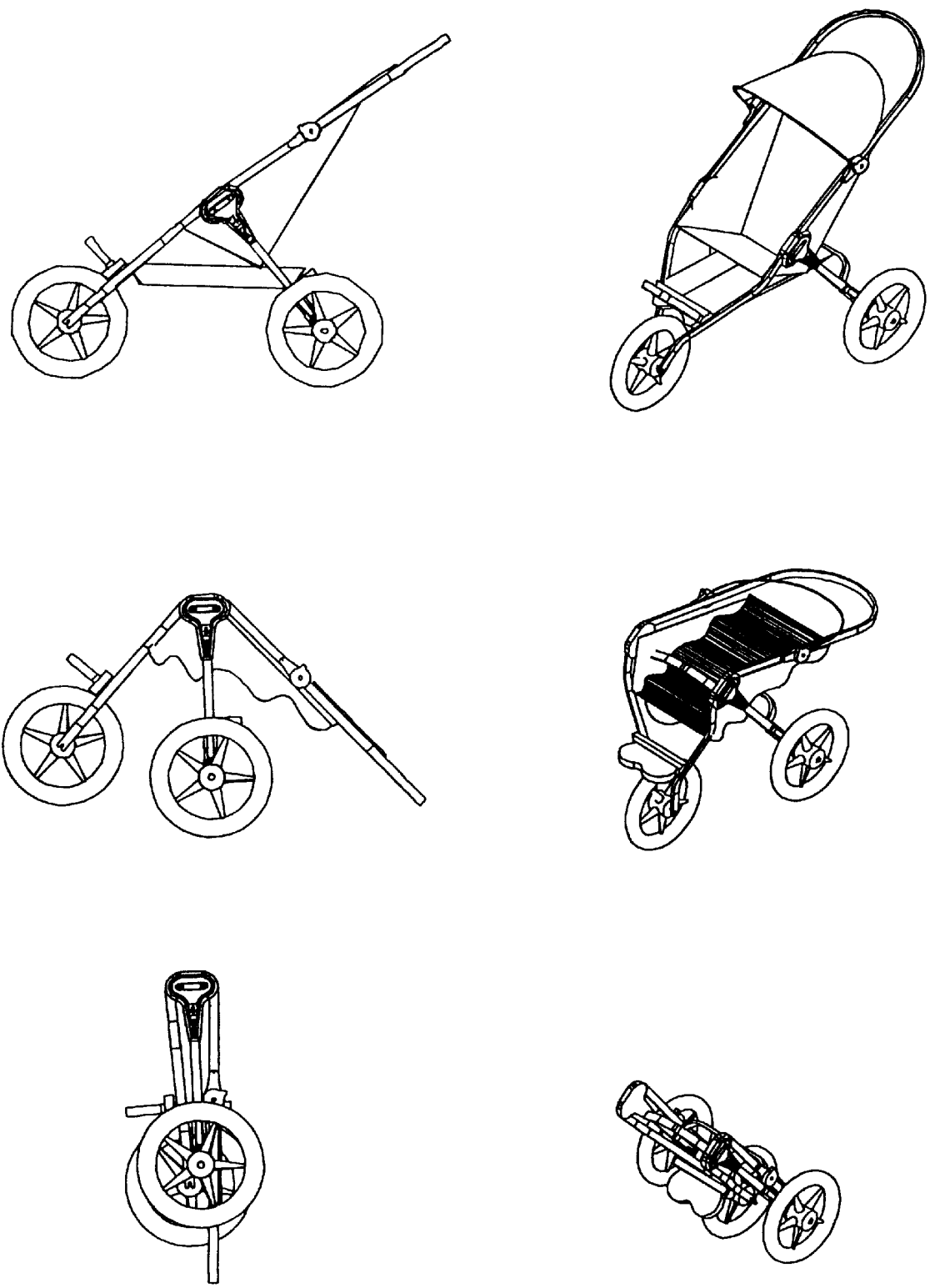
FIG. 7 shows isometric and orthogonal views of the folding procedure.

The folding sequence is outlined here and depicted in FIG. 7:

1) Depress foot brake levers 44 on both rear wheels 31 and retract canopy 60.
2) Remove infant from seat 36.
3) Grab hold of the release strap 34, which is situated in the seat 36, and lift on the strap 34 and continue to hold it. The release strap 34 will pull on both of the release levers 18, which retract the spring-loaded pistons 17. The handle bar 4, because its center of gravity is above the folding mechanism 10, will tend to rotate toward the rear support 3, and because it is geared to the front fork 2, the front fork 2 will rotate toward the rear support 3 as well.

4) The three rigid assemblies 2–4 will be parallel with one another and the stroller is ready for transport or storage. If it is desired to reduce the size of the stroller even more, the quick release pins 42 can be pulled to remove the rear wheels 31 and the front wheel 30 can also be removed.

What is claimed is:

1. A conveniently transportable infant stroller for safely and smoothly carrying an infant over various terrain at speeds faster than average walking speed, said infant stroller comprising:

a) a frame assembly comprising three cantilevered, rigid members, hinged and constrained to move together by a releasable locking and folding mechanism, said mechanism comprising:

two meshing geared components, which rotate relative to a fixed component, a follower secured to each said meshing geared components, a spring-loaded piston secured to the fixed component, and a means of retracting said piston against said spring secured to said fixed component, wherein said mechanism can be secured into a locked and open position;

b) one front wheel and two rear wheels, in tricycle relationship, supported by said frame assembly, wherein each wheel is connected to an axle;

c) axle support means between said frame assembly and said wheels;

d) means for seating attached to said frame assembly, said means for seating being dimensioned and positioned such that a center of gravity of the infant seated therein is generally between forward and rear wheels;

e) means of sheltering infant from weather; and f) shelter support means between said means of sheltering and said frame assembly, said shelter support means giving said sheltering means a plurality of positions.

2. A releasable locking and folding mechanism for hinging three cantilevered, rigid members, constraining them to move together in a controlled manner, said mechanism comprising:

two meshing geared components, which rotate relative to a fixed component, a follower secured to each said meshing geared components, a spring-loaded piston secured to the fixed component, and a means of retracting said piston against said spring secured to said fixed component, wherein said mechanism can be secured into a locked and open position.

3. The releasable locking and folding mechanism of claim 2, wherein a first cantilevered, rigid member is secured to one of said meshing geared components, a second cantilevered, rigid member is secured to the other said meshing geared components, and a third cantilevered, rigid member is secured to said fixed component, thereby creating a constant angular relationship between said cantilevered, rigid members.

4. The releasable locking and folding mechanism of claim 2, wherein said followers contact said spring-loaded piston.

5. The releasable locking and folding mechanism of claim 2, wherein rotation of said meshing geared components is constrained by said followers contacting said spring-loaded piston in one direction and by a lack of gear teeth on said meshing geared components in an opposite direction when said releasable locking and folding mechanism is in its locked and open position.

6. The releasable locking and folding mechanism of claim 2, wherein said means for retracting said piston against said spring is activated, allowing said followers to rotate against said spring-loaded piston, when said releasable locking and folding mechanism is released from its locked and open position.

7. The releasable locking and folding mechanism of claim 2, wherein said spring-loaded piston and said followers have an angled engagement tending to drive the piston into the locked and open position of the mechanism.

8. The releasable locking and folding mechanism of claim 2, wherein a force acting upon said cantilevered, rigid members tends to rotate said cantilevered, rigid members away or toward one another when said releasable locking and folding mechanism is released from its locked and open position.

9. The stroller of claim 1, wherein said frame assembly comprises:

a front fork which provides a mounting location for the front wheel in the tricycle configuration, a rear support which provides mounting locations for the rear wheels in the tricycle configuration, and a handle bar which provides a means for pushing said stroller.

10. The stroller of claim 9, wherein a means for supporting the infant's feet is secured to said front fork.

11. The stroller of claim 9, wherein said mounting locations for the rear wheels comprises a hub assembly which provides a deployable brake to constrain rotation of each of said rear wheels independently and a means for quick removal of said rear wheels.

12. The stroller of claim 11, wherein said deployable brake comprises a lever, pinned to the hub assembly, which, when rotated, engages a toothed disk fixed to said rear wheel.

13. The stroller of claim 12, wherein a spring-loaded rod is attached to an arm of said lever and to said hub assembly, tending to force said brake lever to a fully deployed or fully undeployed position.

14. The stroller of claim 11, wherein the means for quick removal of said rear wheels comprises a spring-loaded pin which engages a notch in the axle of said rear wheel, so that when said pin is forced against said spring, said axle is free to move in an out of said hub assembly, thereby allowing the wheel to be removed from the axle.

15. The stroller of claim 1, wherein said means for sheltering the infant from weather comprises a piece of fabric supported by a batten or bent rod, the batten being secured to said shelter support means.

16. The stroller of claim 15, wherein said shelter support means comprises a rotating piece pivotally attached to said handle bar, said rotating piece being pinned to a spring-loaded rod, wherein said rotating piece has a non-deployed position rotational limit and a deployed position rotational limit.

17. The stroller of claim 16, wherein rotation of said rotating piece is constrained by a fastener seating in a groove on said rotating piece.

18. The stroller of claim 16, wherein said spring-loaded rod tends to force said rotating piece to either the non-deployed position rotational limit or the deployed position rotational limit.

* * * * *